United States Patent
Bach et al.

(10) Patent No.: US 11,799,332 B2
(45) Date of Patent: Oct. 24, 2023

(54) ROTOR FOR AN ELECTRICAL MACHINE, ELECTRICAL MACHINE FOR A VEHICLE, AND METHOD FOR MANUFACTURING A ROTOR FOR AN ELECTRICAL MACHINE

(71) Applicant: Valeo Siemens eAutomotive Germany GmbH, Erlangen (DE)

(72) Inventors: Regina Bach, Bad Neustadt a.d.Saale (DE); Boris Dotz, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 8 days.

(21) Appl. No.: 17/451,374

(22) Filed: Oct. 19, 2021

(65) Prior Publication Data

US 2022/0131429 A1    Apr. 28, 2022

(30) Foreign Application Priority Data

Oct. 23, 2020   (DE) .................. 10 2020 127 928.0

(51) Int. Cl.
*H02K 1/24*   (2006.01)
*B60K 1/00*   (2006.01)
*H02K 15/02*  (2006.01)

(52) U.S. Cl.
CPC ............ *H02K 1/24* (2013.01); *B60K 1/00* (2013.01); *H02K 15/022* (2013.01)

(58) Field of Classification Search
CPC ........ H02K 9/223; H02K 15/022; H02K 3/38; H02K 3/527; H02K 1/24; B60K 1/00
See application file for complete search history.

(56) References Cited

U.S. PATENT DOCUMENTS

| | | | |
|---|---|---|---|
| 2018/0109170 A1 | 4/2018 | Park et al. | |
| 2018/0166936 A1* | 6/2018 | Do | H02K 15/022 |
| 2018/0294684 A1* | 10/2018 | Dorothy | H02K 1/24 |

FOREIGN PATENT DOCUMENTS

| | | | | |
|---|---|---|---|---|
| DE | 102004062162 A1 | 7/2006 | | |
| DE | 102011121793 A1 * | 6/2013 | ............... | H02K 1/24 |
| DE | 102011121793 A1 | 6/2013 | | |
| DE | 102012215084 A1 * | 2/2014 | ............ | H02K 1/276 |
| DE | 102012021494 A1 | 5/2014 | | |
| DE | 102015213593 A1 | 6/2016 | | |
| DE | 102017218111 A1 | 4/2018 | | |
| DE | 102017213904 A1 | 2/2019 | | |

(Continued)

OTHER PUBLICATIONS

DE-102011121793-A1 machine translation on Nov. 19, 2022.*

(Continued)

*Primary Examiner* — Leda T Pham
(74) *Attorney, Agent, or Firm* — Osha Bergman Watanabe & Burton LLP

(57) ABSTRACT

Rotor (1) for an electrical machine (101), having: a rotor core (2) with a plurality of radially outwardly extending rotor legs (3); a number of exciter windings (4) corresponding to the number of rotor legs (3), each wound around one of the rotor legs (3); and a pot-like end cap (5) which covers the end faces of the exciter windings (4) and has a passage opening (6) for a shaft (7), wherein the exciter windings (4) and the end cap (5) delimit intermediate spaces (16), in each of which a casting compound (17) is arranged.

13 Claims, 3 Drawing Sheets

(56) References Cited

FOREIGN PATENT DOCUMENTS

| | | |
|---|---|---|
| DE | 102017222610 A1 | 6/2019 |
| DE | 102018128521 A1 | 5/2020 |
| JP | 2018-016669 A | 2/2018 |
| KR | 10-2008-0081417 A | 9/2008 |

OTHER PUBLICATIONS

DE-102012215084-A1 machine translation on Nov. 19, 2022.*
Extended European Search Report issued in European Application No. 21202372.5, dated Mar. 25, 2022 (8 pages).
German Search Report issued in corresponding German Application No. 10 2020 127 928.0, dated Jun. 1, 2021 (7 pages).

* cited by examiner

ROTOR FOR AN ELECTRICAL MACHINE, ELECTRICAL MACHINE FOR A VEHICLE, AND METHOD FOR MANUFACTURING A ROTOR FOR AN ELECTRICAL MACHINE

TECHNICAL FIELD

The present invention concerns a rotor for an electrical machine. In addition, the invention concerns an electrical machine for a vehicle, and a method for manufacturing a rotor for an electrical machine.

PRIOR ART

DE 10 2004 062 162 A1 discloses an electrical machine with a salient pole generator rotor having an exciter winding. The salient pole generator rotor has poles, between which are pole gaps running in the axial direction.

SUMMARY OF THE INVENTION

Rotors with rotor legs, around which an exciter winding is wound, are subjected to substantial radial forces, such as for example centrifugal forces, during operation. These radial forces pull particularly on the winding heads of the exciter windings. To ensure that the rotor is not restricted in operation by these radial forces, it has already been proposed that the rotor is completely grouted, or additional components are fitted such as reinforcing rings or fixings with bolts and tie rods. Such measures are however costly, awkward in production and complicated to handle.

The invention is therefore based on the object of indicating an improved possibility for operating a rotor.

To achieve this object, according to the invention a rotor for an electrical machine is proposed, having a rotor core with a plurality of radially outwardly extending rotor legs, a number of exciter windings corresponding to the number of rotor legs, each wound around one of the rotor legs, and a pot-like end cap which covers the end faces of the exciter windings and has a passage opening for a shaft, wherein the exciter windings and the end cap delimit intermediate spaces, in each of which a casting compound is arranged.

The invention is based on the consideration of arranging the pot-like end cap on the end faces of the rotor, and grouting or smoothing the intermediate spaces between the exciter windings and the end cap with casting compound. In this way, the casting compound can touch the face ends of the exciter winding, known as the winding heads, and thus ensure better form stability. Particularly advantageously, in addition the casting compound creates a thermal coupling of the winding heads and the end cap, whereby the heat dissipation from the rotor core and the exciter windings is increased. Thus the function of the motor can be guaranteed even under high mechanical and thermal loads, and operation at high rotation speeds is possible.

The rotor core of the rotor according to the invention may be formed by a plurality of axially layered, individual plates which are connected together in rotationally fixed fashion. The rotor core may accordingly also be known as a plate packet. A respective rotor leg with an exciter winding wound around this may form a pole of the rotor. It is particularly preferred if each rotor leg has a pole shoe on the radial outside. The pole shoe may extend further in the circumferential direction than the regions of the rotor leg around which the exciter windings are wound. In a preferred embodiment, the rotor according to the invention has at least two, preferably at least four, particularly preferably at least eight rotor legs, and/or at most twenty, preferably at most sixteen, particularly preferably at most twelve rotor legs. It is particularly preferred if the rotor has precisely eight rotor legs.

The end cap preferably has a plate-like base surface in which the passage opening for the shaft is formed. A collar running around in the circumferential direction may be formed on the rotor-core side of the base surface. The collar is preferably formed on the radially outer edge of the base surface. Preferably, the end cap is made of plastic.

Suitably, the casting compound touches both the exciter winding and the end cap in the intermediate space. The intermediate spaces may be separate from one another, so that the casting compounds arranged in the intermediate spaces are separate from one another or not in contact with one another. The intermediate spaces and the casting compounds arranged therein may however also be cohesive.

With the rotor according to the invention, a respective exciter winding may axially inwardly delimit one of the intermediate spaces. Alternatively or additionally, the end cap may axially outwardly delimit a respective intermediate space. The term "axially inwardly" here means pointing towards an axial centre point of the rotor core. Correspondingly, the term "axially outwardly" means pointing away from an axial centre point of the rotor core.

Preferably, the end cap radially outwardly delimits a respective intermediate space. In particular, the collar of the end cap may radially outwardly delimit a respective intermediate space. Also, a respective intermediate space may be radially inwardly delimited by the shaft.

It is furthermore preferred if an end cap and the intermediate spaces with casting compound arranged therein are provided on both end faces of the rotor core. All statements relating to one of the end faces may be transferred to the other of the end faces.

In a preferred embodiment of the rotor according to the invention, it is furthermore provided that the casting compound thermally conductively contacts the shaft. The phrase "thermally conductively contacts" means in particular that the casting compound touches and/or is directly connected to the shaft. Thus a thermal path may be formed from the winding head to the shaft in order to further increase the heat dissipation.

Advantageously, with the rotor according to the invention, it may be provided that the end cap on the rotor-core side has a surface contour which delimits a respective intermediate space in the circumferential direction, in particular on both sides. The end cap and the intermediate spaces are thereby adapted to the form of the winding heads. The surface contour preferably extends axially inwardly from the base surface of the end cap. The surface contour may transform radially outwardly into the collar.

The rotor according to the invention furthermore preferably comprises a terminating device which is arranged on the end face of the rotor core and comprises terminating elements which extend between the rotor leg and the exciter winding. In other words, a respective exciter winding is wound around both the rotor leg and the terminating element. The number of terminating elements may correspond to the number of rotor legs. The terminating device in particular allows the winding heads to be formed in a material-protective fashion, since these do not rest directly on the rotor core but axially outwardly on the terminating elements. The terminating elements are therefore preferably configured rounded in regions around which the exciter winding is wound.

Preferably, each terminating element comprises on the radial outside a protrusion which extends axially outwardly at least as far as the exciter winding. Thus a depression may be formed for receiving the exciter winding.

In an advantageous refinement, the end cap radially outwardly overlaps the terminating device. The intermediate spaces may thereby be reliably closed on the radial outside. In particular, this prevents an emergence of casting compound during its insertion into the intermediate spaces. The end cap in particular radially outwardly overlaps a respective protrusion of the terminating elements.

It may furthermore be provided that the end cap is attached by latching elements to at least some of the terminating elements. This achieves a reliable fixing of the end cap to the terminating elements. Preferably, the latching elements are formed by opposing complementary latching lugs on the collar of the end cap and on the protrusion of the terminating element.

In order to further increase the effective heat transmission area of the casting compound, it is preferred if the terminating device has a surface structure which is formed by axial depressions, wherein the casting compound extends into the depressions. The surface structure may for example be formed by a perforation. Here, bores which preferably point axially inwardly may be formed in the terminating device. Alternatively or additionally, the surface structure may be formed by a groove running in the circumferential direction.

Preferably, the terminating device furthermore comprises an annular body which surrounds the passage opening for the shaft, and from which the terminating elements extend radially outwardly. The annular body may extend axially further outward than the exciter windings.

In a particularly preferred embodiment, the surface structure is formed in the annular body.

Preferably, the rotor according to the invention furthermore comprises a number of separating elements corresponding to the number of rotor legs, said separating elements being arranged between respective adjacent pairs of rotor legs. The separating elements, also known as coil separators, are preferably wedge-shaped, wherein their tips point radially inwardly. The separating elements preferably extend axially completely along the exciter windings. Preferably, the separating elements extend radially outwardly no further than the rotor legs, in particular at most up to the radially innermost point of the pole shoes. The separating elements preferably extend axially further outward than the exciter windings.

It is advantageous if a respective separating element unilaterally delimits two adjacent intermediate spaces in the circumferential direction. Alternatively or additionally, it may be provided that a respective separating element rests on the end cap, in particular on its surface contour. The delimitation of the intermediate spaces in the circumferential direction can here be achieved jointly by the separating elements and the end cap.

In a preferred embodiment of the rotor according to the invention, the casting compound is a hardened heat-conductive paste. This allows a particularly simple filling of the intermediate spaces with the casting compound since the heat-conductive paste is semi-fluid in its processing state. The heat-conductive paste can thus firstly be easily distributed into the intermediate spaces. Secondly, its viscosity is so high that the risk of contamination during filling from emerging heat-conductive paste can be reduced.

The object on which the invention is based is furthermore achieved by an electrical machine for a vehicle, comprising a stator and a rotor according to the invention which is rotatably mounted inside the stator. The electrical machine is in particular an electric motor. The electrical machine is preferably electrically excited, in particular separately excited. The electrical machine is preferably configured for driving the vehicle, in particular part of a drive train for an electrically driven vehicle such as a battery electric vehicle (BEV) or hybrid vehicle.

The object on which the invention is based is furthermore achieved by a method for manufacturing a rotor for an electrical machine, in particular a rotor according to the invention, having the following steps: provision of a rotor core with a plurality of radially outwardly extending rotor legs, around which is wound a number of exciter windings corresponding to the number of rotor legs, and a pot-like end cap which covers the end faces of the exciter windings and has a passage opening for a shaft, wherein the exciter windings and the end cap delimit intermediate spaces; filling of the intermediate spaces with a casting compound which is preferably a heat-conductive paste and/or has a dynamic viscosity of at least 0.1 Pa·s, in particular at least 1 Pa·s; and hardening of the casting compound.

When the casting compound with the above-mentioned dynamic viscosity is used, it has the viscosity necessary for production-friendly filling of the intermediate spaces.

All statements relating to the rotor according to the invention may be transferred accordingly to the method according to the invention, so that the above-mentioned advantages can also be achieved with said method.

BRIEF DESCRIPTION OF THE FIGURES

Further advantages and details of the present invention emerge from the exemplary embodiments described below and on the basis of the drawings. These are schematic illustrations and show.

DETAILED DESCRIPTION OF THE INVENTION

Figure 1:
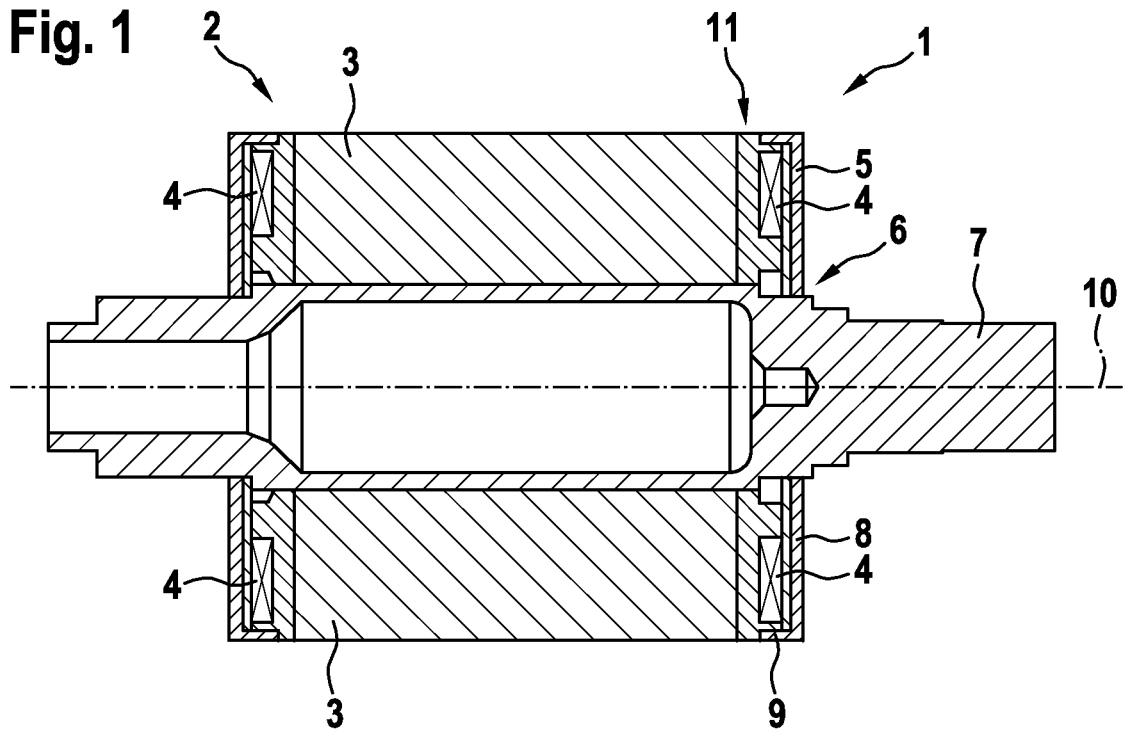
FIG. 1 a sectional view of a first exemplary embodiment of the rotor according to the invention.

FIG. 1 shows a sectional view of a first exemplary embodiment of a rotor 1.

The rotor 1 has a rotor core 2 with a plurality of radially outwardly extending rotor legs 3 which may be formed as a plate packet. In the present exemplary embodiment, as an example, eight rotor legs 3 are provided. In addition, the rotor 1 has a number of exciter windings 4 corresponding to the number of rotor legs 3, each wound around the rotor legs 3.

Also, the rotor 1 comprises a pot-like end cap 5 which covers the end faces of the exciter windings 4 and has a passage opening 6 for a shaft 7. The end cap 5 may for this have a base surface 8 in which the passage opening 6 is formed, and an axially inwardly extending collar 9 which is arranged on the radially outer edge of the base surface 8 and extends completely about the rotational axis 10 of the rotor 1 in the circumferential direction.

Figure 2:
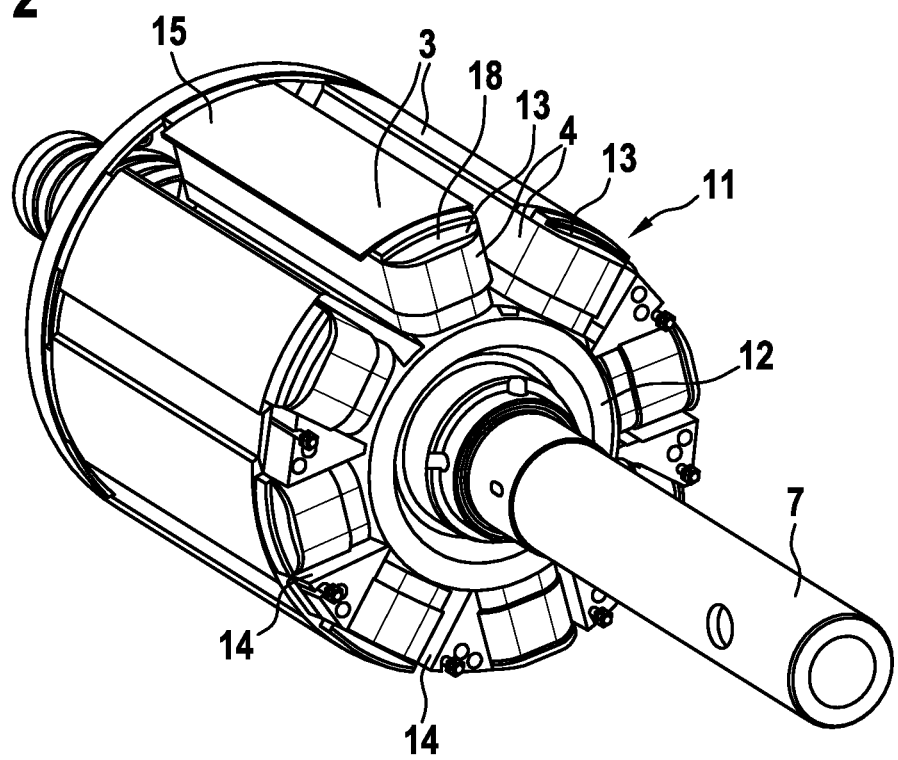
FIG. 2 a perspective, detail depiction of the rotor core, the exciter windings, the terminating device and the separating elements of the first exemplary embodiment.

FIG. 2 is a perspective illustration of individual components of the rotor 1 according to the first exemplary embodiment.

The rotor 1 may furthermore comprise a terminating device 11 which has an annular body 12 through which the shaft 7 extends, and several terminating elements 13 protruding radially outwardly from the body 12. The terminating elements 13 in particular extend between a respective rotor leg 3 and the exciter winding 4 wound around this.

Optionally, the rotor 1 has eight separating elements 14, two of which are not shown in FIG. 2. The separating elements 14 may be wedge-shaped and arranged between a respective pair of adjacent pair of rotor legs 3. The separating elements 14 here preferably extend completely along the rotor legs 3 in the axial direction, and are furthermore formed axially slightly wider than the exciter windings 4.

Finally, FIG. 2 also shows preferably provided pole shoes 15 of a respective rotor leg 3, which define the outer periphery of the rotor 1.

Figure 3:
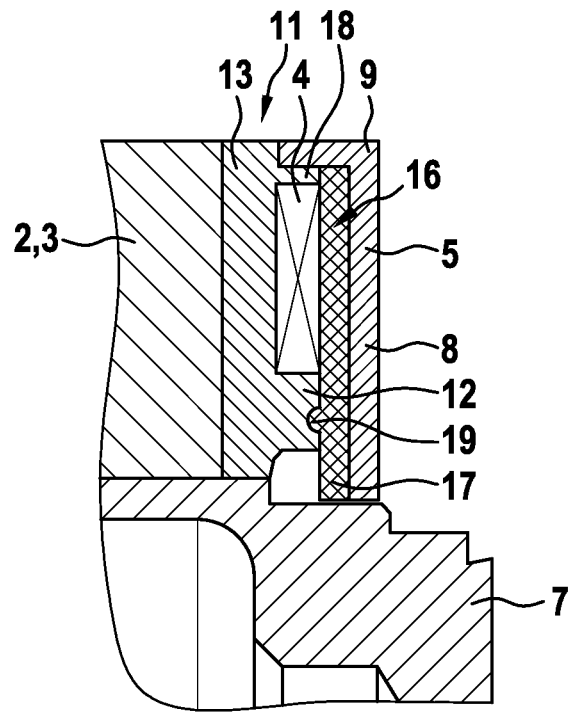
FIG. 3 a sectional, detail view of the first exemplary embodiment in the region of one of the intermediate spaces.

FIG. 3 is a sectional, detail view of the first exemplary embodiment in the region of an intermediate space 16 between a respective exciter winding 4 and the end cap 5.

The intermediate space 16 is delimited axially inwardly by the exciter winding 4 and the terminating element 13, axially outwardly by the base surface 8 of the end cap 5, radially outwardly by the collar 9 of the end cap 5, and radially inwardly by the shaft 7. A casting compound 17, formed from a hardened heat-conductive paste, is arranged in the intermediate space 16. The heat-conductive paste is preferably semi-fluid during manufacture of the rotor 1 so that it can be easily introduced into the intermediate space 16. It can then harden into the casting compound 17 illustrated. The casting compound 17 mechanically stabilises the end faces of the exciter windings 4, known as the winding heads. Also, the casting compound 17 forms a heat-transmission path from the winding heads to the shaft 7, and a further heat-transmission path from the winding heads via the end cap 5 to the shaft 7, which improves the heat dissipation of the exciter windings 4 and the rotor core 2.

In the circumferential direction, the intermediate spaces 16 are delimited by an axially inwardly pointing surface contour (not shown) of the end cap 5. The separating elements 14 lie on the surface contour, and thereby also each unilaterally delimit two intermediate spaces 16 in the circumferential direction.

As furthermore evident from FIG. 3, the end cap 5 or its collar 9 may rest in particular radially outwardly on and be attached to the protrusion 18 of the terminating element 13. In addition, a depression 19 may be formed in the annular body 12, for example in the form of bores and/or an annular groove, into which the casting compound 17 also extends in order to increase the effective heat exchange area.

Figure 4:
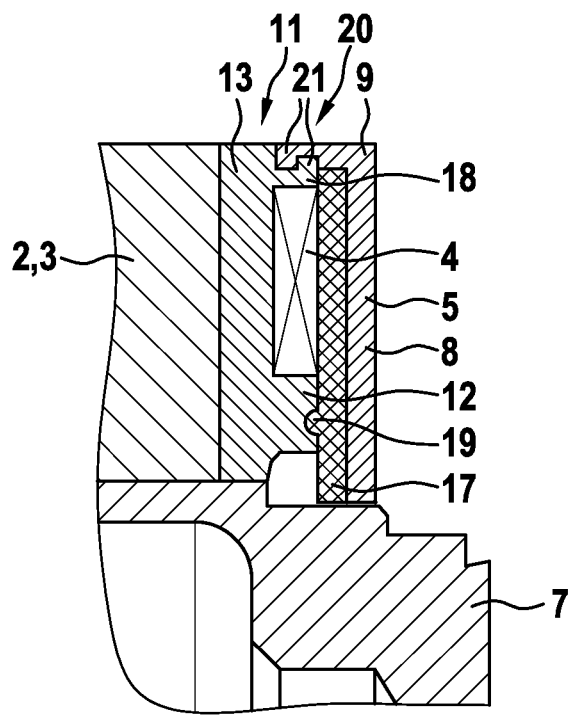
FIG. 4 a sectional, detail view of a second exemplary embodiment of the rotor according to the invention in the region of one of the intermediate spaces.

FIG. 4 is a sectional, detail view of a second exemplary embodiment of the rotor 1 in the region of the intermediate space 16 between a respective exciter winding 4 and the end cap 5. Unless stipulated otherwise, all statements relating to the first exemplary embodiment may be transferred to this exemplary embodiment. The same or equivalent components carry identical reference signs.

The second exemplary embodiment is in particular distinguished in that the end plate 5 is secured to the terminating device 11 by latching elements 20. For this, opposing complementary latching lugs 21 may be formed on the collar 9 and on the protrusion 18, and hold the end plate 5 by force fit on the respective terminating element 13.

Figure 5:
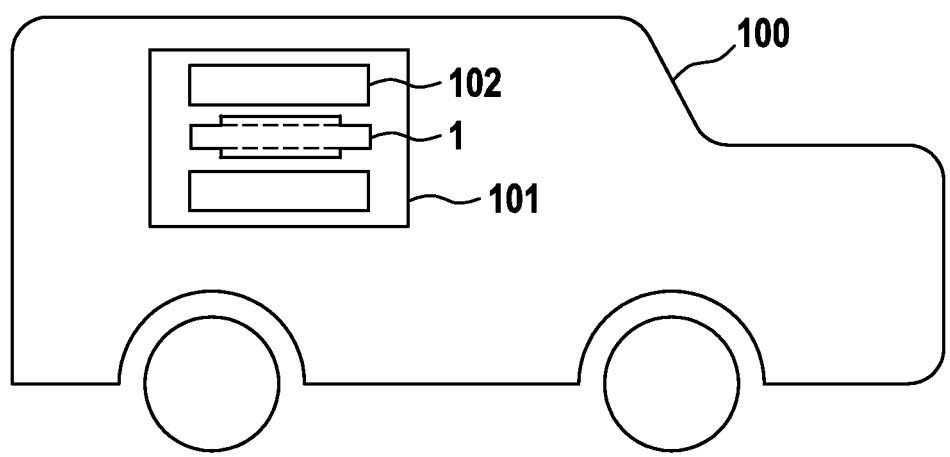
FIG. 5 a basic diagram of a vehicle with an exemplary embodiment of the electrical machine according to the invention.

FIG. 5 is a basic diagram of a vehicle 100 which comprises an electrical machine 101 configured for driving the vehicle 100. The electrical machine 101 comprises a stator 102 and a rotor 1 according to one of the above-described exemplary embodiments, which is rotatably mounted inside the stator. The electrical machine 101 may be configured as an electric motor and as a separately excited synchronous machine.

The invention claimed is:

1. A rotor for an electrical machine, comprising:
   a rotor core with a plurality of radially outwardly extending rotor legs;
   a number of exciter windings corresponding to the number of rotor legs, each wound around one of the rotor legs;
   a pot-like end cap which covers end faces of the exciter windings and has a passage opening for a shaft; and
   a terminating device which is arranged on an end face of the rotor core and comprises terminating elements which each extend between the rotor legs and the exciter windings,
   wherein the exciter windings and the end cap delimit intermediate spaces, in each of which a casting compound is arranged, and
   wherein the terminating device has a surface structure which is formed by axial depressions, wherein the casting compound extends into the axial depressions.

2. The rotor according to claim 1, wherein:
   a respective exciter winding axially inwardly delimits one of the intermediate spaces, and/or
   the end cap axially outwardly delimits a respective intermediate space, and/or
   the end cap radially outwardly delimits a respective intermediate space, and/or
   the shaft radially inwardly delimits a respective intermediate space.

3. The rotor according to claim 1, wherein the casting compound thermally conductively contacts the shaft.

4. The rotor according to claim 1, wherein the end cap on a rotor core side has a surface contour which delimits a respective intermediate space in a circumferential direction.

5. The rotor according to claim 1, wherein the end cap radially outwardly overlaps the terminating device.

6. The rotor according to claim 1, wherein the end cap is attached by latching elements to at least some of the terminating elements.

7. The rotor according to claim 1, wherein the surface structure is formed by a perforation and/or a groove running in the circumferential direction.

8. The rotor according to claim 1, wherein the terminating device has an annular body which surrounds the passage opening for the shaft, and from which the terminating elements extend radially outwardly, wherein the surface structure is formed in the annular body.

9. The rotor according to claim 1, further comprising a number of separating elements corresponding to the number of rotor legs, said separating elements being arranged between respective adjacent pairs of rotor legs.

10. The rotor according to claim 9, wherein a respective separating element unilaterally delimits two adjacent intermediate spaces in the circumferential direction and/or rests on the end cap.

11. The rotor according to claim 1, wherein the casting compound is a hardened heat-conductive paste.

12. An electrical machine for a vehicle, comprising:
a stator; and
a rotor according to claim 1, which is rotatably mounted inside the stator.

13. A method for manufacturing a rotor for an electrical machine according to claim 1, the method comprising:
provision of a rotor core with a plurality of radially outwardly extending rotor legs, around which is wound a number of exciter windings corresponding to the number of rotor legs, and a pot-like end cap which covers the end faces of the exciter windings and has a passage opening for a shaft, wherein the exciter windings and the end cap delimit intermediate spaces;
filling of the intermediate spaces with a casting compound which is a heat-conductive paste and/or has a dynamic viscosity of at least 1 Pa·s; and
hardening of the casting compound.

* * * * *